(12) United States Patent
Spital

(10) Patent No.: US 8,992,229 B2
(45) Date of Patent: Mar. 31, 2015

(54) ASSESSMENT TOOL AND GRADED ACTIVITY FOR FINE-GROSS MOTOR SKILLS, VISUAL AND COGNITIVE PROCESSING

(71) Applicant: David E. Spital, Rincon, GA (US)

(72) Inventor: David E. Spital, Rincon, GA (US)

( * ) Notice: Subject to any disclaimer, the term of this patent is extended or adjusted under 35 U.S.C. 154(b) by 47 days.

(21) Appl. No.: 13/725,530

(22) Filed: Dec. 21, 2012

(65) Prior Publication Data

US 2013/0171604 A1    Jul. 4, 2013

Related U.S. Application Data

(60) Provisional application No. 61/581,471, filed on Dec. 29, 2011.

(51) Int. Cl.
*G09B 1/02* (2006.01)
*G09B 19/22* (2006.01)
*A63F 9/00* (2006.01)

(52) U.S. Cl.
CPC . *G09B 19/22* (2013.01); *A63F 9/00* (2013.01); *G09B 1/02* (2013.01)
USPC .......................................... 434/259; 434/260

(58) Field of Classification Search
CPC ...................................................... G09B 1/10
USPC .................. 434/236, 247, 258, 259
See application file for complete search history.

(56) References Cited

U.S. PATENT DOCUMENTS

| | | | |
|---|---|---|---|
| 1,119,870 A | 12/1914 | Pettit | |
| 3,596,377 A * | 8/1971 | Abbey | 434/236 |
| 3,693,976 A | 9/1972 | Flack | |
| 3,751,039 A | 8/1973 | Dykoski | |
| 4,043,559 A | 8/1977 | Eigen | |
| 4,111,418 A | 9/1978 | DeMent, Jr. | |
| 4,114,892 A | 9/1978 | Csoka | |
| 4,239,230 A | 12/1980 | Shoptaugh | |
| 4,522,408 A | 6/1985 | McKee | |
| 4,645,209 A | 2/1987 | Goulter et al. | |
| 4,875,688 A | 10/1989 | Whaley | |

(Continued)

OTHER PUBLICATIONS

"Sammons Pegboard," Sammons, http://web.archive.org/web/20111021100514/http://healthproductsforyou.com/p-5658-sammons-pegboard-for-multi-colored-beaded-pegs.html, Oct. 21, 2011.*
"Development of a Standard Test Battery," K. Robinette, http://www.dtic.mil/dtic/tr/fulltext/u2/a188314.pdf, Apr. 1987.*
Patterson Medical, 2012 Hand Rehab Catalog, p. 331, 2012.*

(Continued)

*Primary Examiner* — Robert J Utama
*Assistant Examiner* — Jennifer L Fassett

(57) ABSTRACT

A timed assessment and graded activity, allows professional staff, occupational therapist, school psychologist, physician (neurologist and pediatrician), and the like, to assess their patients in various areas. The assessment and graded activity can be used for motor skills, including fine-gross motor coordination and hand speed. The assessment and graded activity can also be used for assessing vision, including color, eye-hand coordination, crossing midline, left or right side neglect, and eye movements, crossing midline and left-right side neglect. Furthermore, the assessment and graded activity can be used for determining cognitive skills, including processing, concentration, attention deficit, problem solving, and ability to follow instructions. The 21-piece challenge as an assessment and graded activity designed to use a set of wooden dowels with its respective board. The 21 pieces of wood dowels contains five pieces of a first color, four pieces of three other colors, and two pieces of two other colors.

9 Claims, 4 Drawing Sheets

(56) References Cited

U.S. PATENT DOCUMENTS

| | | |
|---|---|---|
| 5,069,458 A | 12/1991 | Washington |
| 6,082,545 A | 7/2000 | Ford et al. |
| 6,135,455 A | 10/2000 | McNally |
| 6,276,687 B1 | 8/2001 | Lenhart |
| 2002/0125636 A1 | 9/2002 | Lundberg |
| 2008/0174069 A1 | 7/2008 | Ouellet |
| 2011/0018202 A1 | 1/2011 | Jimick |

OTHER PUBLICATIONS

"Golf Tee Marble Balance," Shannon, http://totschool.shannons.org/golf-tee-marble-balance/, Oct. 21, 2010.*

"Socket Head Cap Screws," Fastener Superstore, https://web.archive.org/web/20090925114902/http://www.fastenersuperstore.com/sockets/Socket-Head-Cap-Screws, Sep. 25, 2009.*

Patterson Medical, 2012 Hand Rehab Catalog, pp. 330-332, 2012.

North Coast Medical, band therapy Catalog, p. 154, 2012-2013, vol. 1.

* cited by examiner

ASSESSMENT TOOL AND GRADED ACTIVITY FOR FINE-GROSS MOTOR SKILLS, VISUAL AND COGNITIVE PROCESSING

CROSS-REFERENCE TO RELATED APPLICATION

This application claims the benefit of priority of U.S. provisional application No. 61/581,471, filed Dec. 29, 2011, the contents of which are herein incorporated by reference.

BACKGROUND OF THE INVENTION

The present invention relates to physical, visual and cognitive skills practice and assessment tools and more particularly, to a twenty-one piece challenge which is an assessment tool and graded activity for fine and gross motor skills as well as visual and cognitive processing.

Conventional occupational therapy (OT) tools on the market assess for or help to improve either hand speed coordination or depth perception. These tools are often limited to a single template, where a user may master the template and, thus, render the tool no longer useful for the particular user. Finally, these conventional OT tools do not offer a combined assessment and graded activity for a combination of physical, visual and cognitive skills, all in a single tool.

As can be seen, there is a need for an improved assessment tool which can not only provide for an initial assessment, but also provide multiple templates affording the ability to be used as both an assessment and a graded activity to improve user's physical, visual and cognitive skills.

SUMMARY OF THE INVENTION

In one aspect of the present invention, as an assessment comprises at least one peg template having 21 holes arranged thereupon; and pegs operable to be placed in the holes, wherein the pegs include five pegs of a first color, four pegs of a second color, four pegs of a third color, four pegs of a fourth color, two pegs of a fifth color and two pegs of a sixth color; and the 21 holes are arranged so the pegs are disposable in the holes so no two pegs of the same color are disposed adjacent to one another.

In another aspect of the present invention, an assessment comprises a large peg template having 21 holes having a first diameter arranged thereupon; a medium peg template having 21 holes having a second diameter arranged thereupon; a small peg template having 21 holes having a third diameter arranged thereupon; pegs operable to be placed in the holes; and a threaded insert disposed in an end of each of the pegs having the first diameter, wherein the pegs include five pegs of a first color of each of the first diameter, the second diameter and the third diameter, four pegs of a second color of each of the first diameter, the second diameter and the third diameter, four pegs of a third color of each of the first diameter, the second diameter and the third diameter, four pegs of a fourth color of each of the first diameter, the second diameter and the third diameter, two pegs of a fifth color of each of the first diameter, the second diameter and the third diameter, and two pegs of a sixth color of each of the first diameter, the second diameter and the third diameter; the 21 holes are arranged so the pegs are disposable in the holes so no two pegs of the same color are disposed adjacent to one another; and the second diameter is smaller than the first diameter and the third diameter is smaller than the second diameter.

These and other features, aspects and advantages of the present invention will become better understood with reference to the following drawings, description and claims.

DETAILED DESCRIPTION OF THE INVENTION

Figure 1:
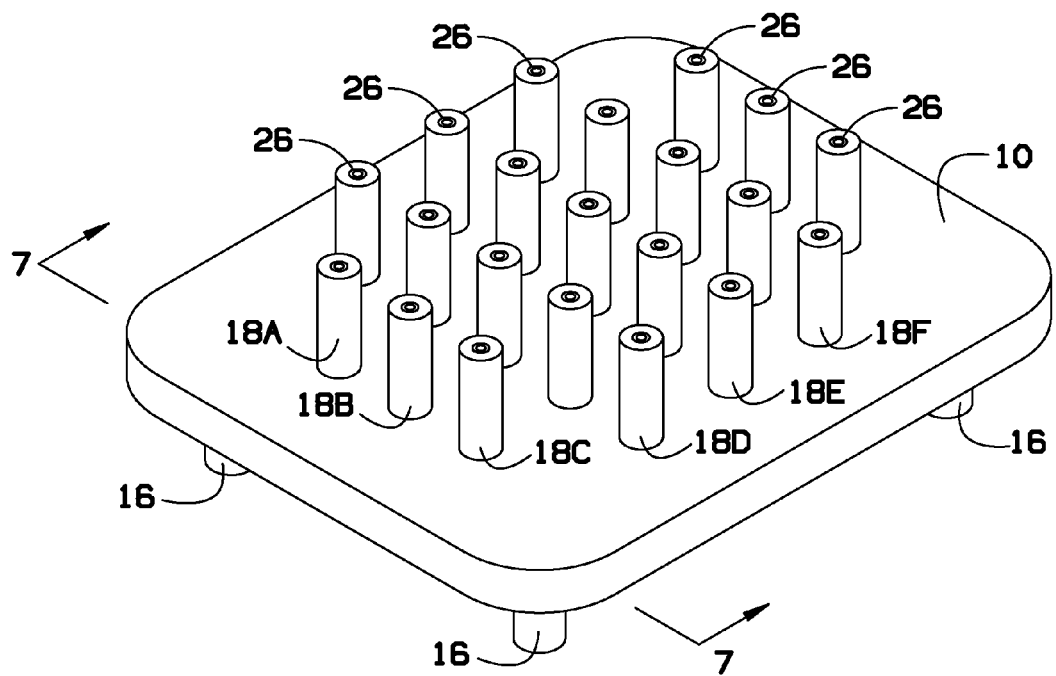
FIG. 1 is a perspective view of a peg template of an assessment tool according to an exemplary embodiment of the present invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a timed assessment and graded activity which allows professional staff occupational therapist, but also school psychologist, physician (neurologist and pediatrician), and the like, to assess their patients in various areas. The assessment can be used for motor skills, including fine-gross motor coordination and hand speed. The assessment can also be used for assessing vision, including color, eye-hand coordination, crossing midline, left or right side neglect, and eye movements, crossing midline and left-right side neglect. Furthermore, the assessment can be used for determining cognitive skills, including processing, concentration, attention deficit, problem solving, and ability to follow instructions. The 21-piece challenge as an assessment is designed to use a set of wooden dowels with its respective board. The 21 pieces of wood dowels contains five pieces of a first color, four pieces of three other colors, and two pieces of two other colors.

As used herein, the term "assessment tool" refers not only to a tool to assess a user's physical (gross and fine motor) skills, cognitive ability and visual skills, but also refers to a graded activity. A graded activity, by definition, makes an activity more challenging for the user as the user improves their skills. Therefore, when an "assessment tool" is referred to in the present disclosure and claims, this refers to both the assessment ability and graded activity ability of the tool. The assessment tool of the present invention may also be used as a toy, depending on the application for the user.

As used herein, the term "adjacent" refers being next to one another, either vertically, horizontally, or diagonally. Various elements of the present invention, as described below, can be adjacent to each other, including pegs, socket head cap screws, marbles and the like.

Referring now to FIGS. 1 through 7, an assessment tool can include one or more peg templates, such as three peg templates, designed to accept different sizes of pegs. For example, a large peg template 10, a medium peg template 12 and a small peg template 14 can be provided with the assessment tool. The peg templates 10, 12, 14 can include legs 16 on a bottom side thereof. The legs 16 may be optional, but may provide means for additional assessments/activities, as described below.

The peg templates 10, 12, 14 can have 21 holes formed therein. The holes can be arranged, typically, equally spaced apart, with 15 holes forming a 5×3 grid (for explanation purposes, this will be described as three columns and five rows, although it could just as well be explained as three rows and five columns). An additional column of three rows is disposed adjacent rows 2, 3 and 4 of the 5×3 grid on each end thereof, thus forming the 21 holes in the peg templates 10, 12, 14. The holes in the large peg template 10 can be larger than the holes in the medium peg template 12 and the small peg template 14, while the holes in the medium peg template 12 can be larger than the holes in the small peg template 14. In some embodiments, the holes in the large peg template 10 can be from about ¾ inch to about 1 inch, while the holes in the medium peg template 12 and the small peg template 14 and each be progressively smaller.

The pegs for the large peg template 10 can be colored so there are five pegs of a first color 18A, four pegs of a second color 18B, four pegs of a third color 18C, four pegs of a fourth color 18D, two pegs of a fifth color 18E and two pegs of a sixth color 18F. The pegs 18A-F can be colored with their respective colors in various manners, such as coloring the entire peg, placing one or more colored stripes on the peg, color coding a top and/or bottom end of the peg and the like. The color scheme allows a user to place the pegs in the holes in the peg template so no two same colored pegs are placed adjacent to each other when all 21 pegs are placed into the 21 holes.

With the medium peg template 12, there are five pegs of a first color 20A, four pegs of a second color 20B, four pegs of a third color 20C, four pegs of a fourth color 20D, two pegs of a fifth color 20E and two pegs of a sixth color 20F. The pegs 20A-F can be colored with their respective colors in various manners, such as coloring the entire peg, placing one or more colored stripes on the peg, color coding a top and/or bottom end of the peg and the like. The color scheme allows a user to place the pegs in the holes in the peg template so no two same colored pegs are placed adjacent to each other when all 21 pegs are placed into the 21 holes.

With the small peg template 14, a similar design can be made, with five pegs of a first color 22A, four pegs of a second color 22B, four pegs of a third color 22C, four pegs of a fourth color 22D, two pegs of a fifth color 22E and two pegs of a sixth color 22F. The pegs 22A-F can be colored with their respective colors in various manners, such as coloring the entire peg, placing one or more colored stripes on the peg, color coding a top and/or bottom end of the peg and the like. The color scheme allows a user to place the pegs in the holes in the peg template so no two same colored pegs are placed adjacent to each other when all 21 pegs are placed into the 21 holes.

Various assessments and graded activities can be carried out with the assessment tool of the present invention. For example, a patient can be instructed to place the pegs into the holes so no two of the same color are adjacent each other. The task can be timed and a limit can be placed on the task so after a certain period of time, such as five minutes, the task is complete, regardless of how many pegs are disposed in the holes. This can help avoid patient frustration. Moreover, the patient can, once they master the larger pegs, move to smaller pegs, resulting in a graded activity for the user.

The patient can be encouraged to use their affected hand. Or, if not applicable, the patient can be instructed to use their dominant hand, followed with re-testing with their non-dominant hand.

Once patient has completed the initial assessment or graded activity one time, the therapist can determine when to demonstrate how to complete the task correctly with patient being re-tested following the demonstration. This can be used to help assess for recall/memory.

Figure 2:
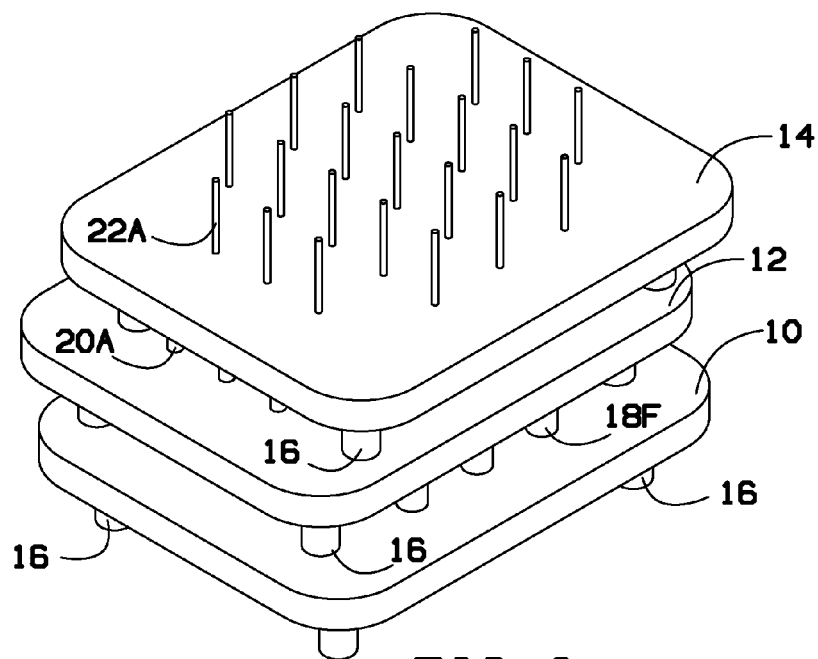
FIG. 2 is a perspective view of three peg templates in a stacked configuration of an assessment tool according to an exemplary embodiment of the present invention.
Figure 3:
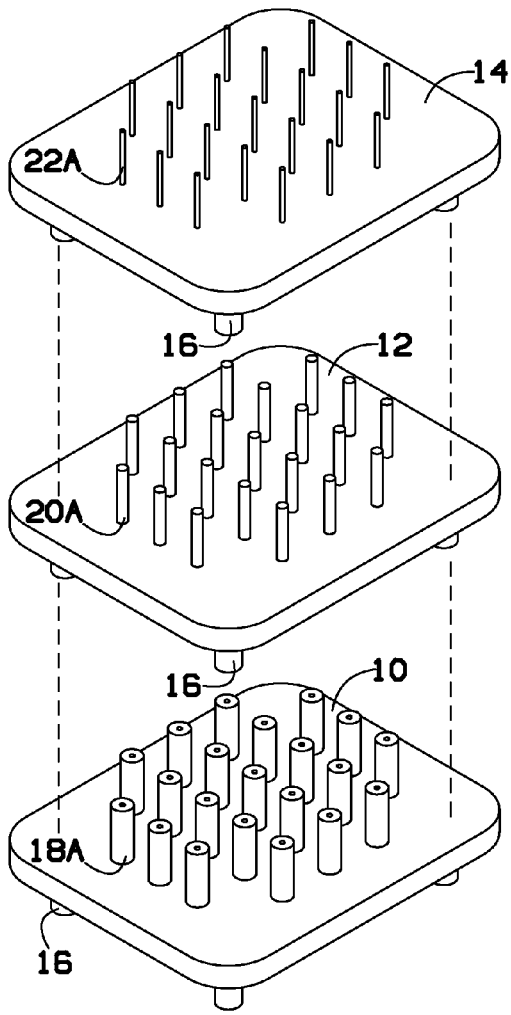
FIG. 3 is an exploded perspective view of the three peg templates of the stacked configuration shown in FIG. 2.
Figure 4:
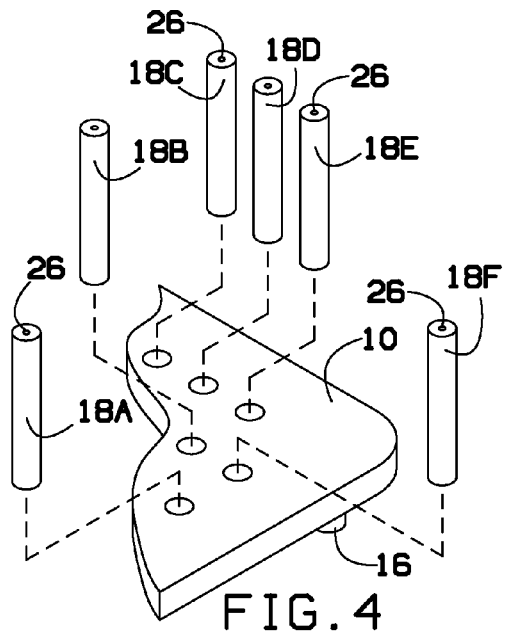
FIG. 4 is a detailed, exploded perspective view of a portion of the peg template (large peg template) of FIG. 1.
Figure 5:
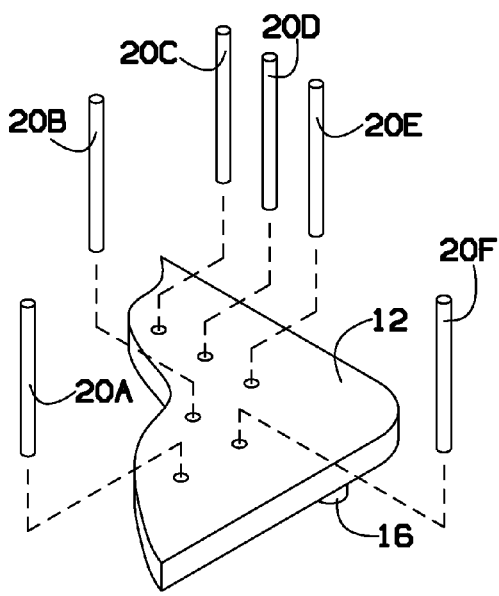
FIG. 5 is a detailed, exploded perspective view of a portion of a middle one (medium peg template) of the three peg templates of the stacked configuration shown in FIG. 2.
Figure 6:
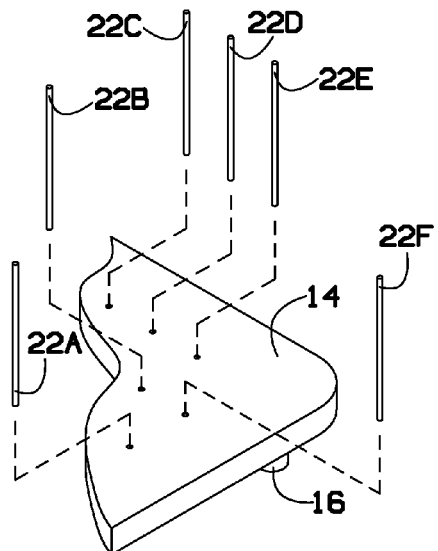
FIG. 6 is a detailed, exploded perspective view of a portion of a top one (small peg template) of the three peg templates of the stated configuration shown in FIG. 2.
Figure 7:
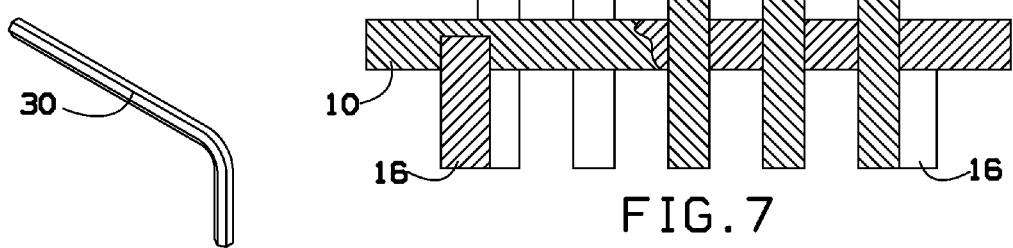
FIG. 7 is a cross-sectional view taken along line 7-7 of FIG. 1.
Figure 8:
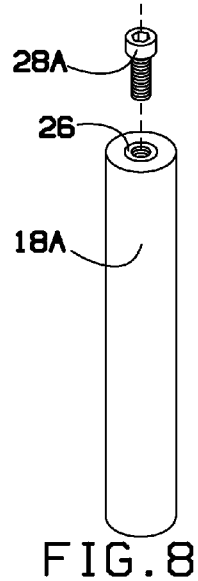
FIG. 8 is an exploded view of a peg, illustrating a socket head cap screw and hex key tool, according to an exemplary embodiment of the present invention.
Figure 9:
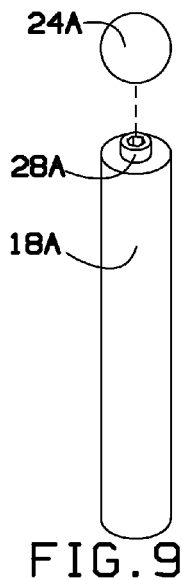
FIG. 9 is a perspective view of the peg of FIG. 8, assembled, showing placement of a marble upon a socket head cap.
Figure 10:
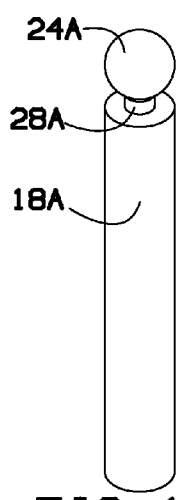
FIG. 10 is a perspective view of the peg of FIG. 8, assembled, showing the marble placed thereupon.
Figure 11:
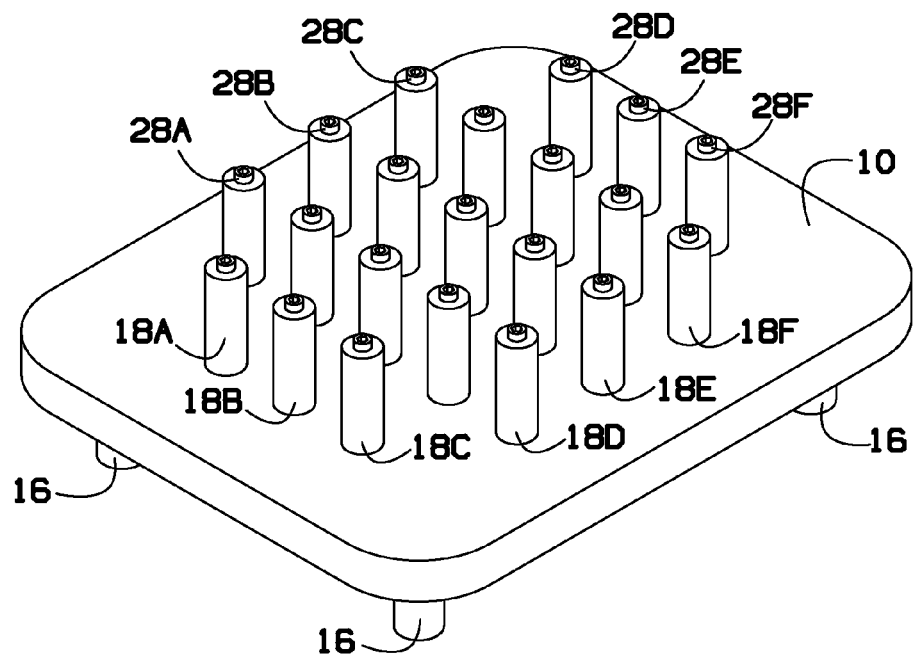
FIG. 11 is a perspective view of a peg template of an assessment tool according to an exemplary embodiment of the present invention.
Figure 12:
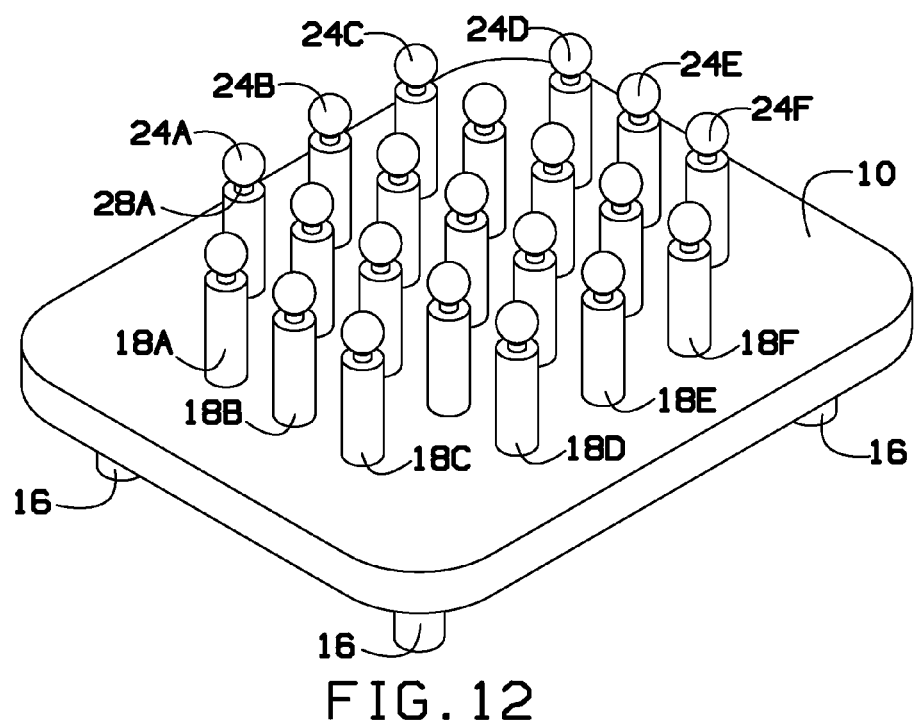
FIG. 12 is a perspective view of the peg template of FIG. 11, illustrating large pegs, and socket head cap screws assembled, and marbles placed thereupon.

The patient can use different sizes of pegs to help with motor skill development. For example, the patient can start with the larger sized pegs and, as they master the skill, move to the small sized pegs. In some embodiments, the patient can solve all three peg templates, stacking them on top of each other (as shown in FIG. 2) as the task is solved on each layer.

Referring now to FIGS. 7 through 12, the pegs (such as the large pegs 18A-F) can include a threaded insert 26 disposed into a top end thereof. A socket head cap screw (such as socket head cap screw 28A) can be inserted into the threaded insert 26. The patient can use their fingers, a hex key tool 30, or both, to accomplish the task of screwing the socket head cap screws into the threaded inserts 26. This can further test, develop and assess the patient's motor skills. Moreover, this task can be used as a graded activity, providing the patient with additional challenges as they master placement of the pegs.

The socket head cap screws (also referred to cap screws, or screws) can be provided with a color scheme similar to that described above with respect to the pegs, with five socket head cap screws in a first color 28A, four socket head cap screws in a second color 28B, four socket head cap screws in a third color 28C, four socket head screws in a fourth color 28D, two socket head cap screws in a fifth color 28E, and two socket head screws in a sixth color 28F. The patient can be instructed to place the screws 28A-F into the threaded inserts 26 and may also be instructed to arrange the colors so no two of the same color are adjacent to each other. In some embodiments, the patient can be instructed to further make so the color of the cap screws are different from the color of the pegs, providing an extra level of cognitive difficulty in the assessment.

In some embodiments, a plurality of marbles can be provided to the patient, with the instructions to place the marbles on top of each of the cap screws. This can help assess visual and motor skills. In some embodiments, the marbles can be color coded similar to the pegs, with five marbles of a first color 24A, four marbles of a second color 24B, four marbles of a third color 24C, four marbles of a fourth color 24D, two marbles of a fifth color 24E and two marbles of a sixth color 24F. The patient can be instructed to place the marbles 24A-F onto the cap screws 28A-F and may also be instructed to arrange the colors so no two of the same color are adjacent to each other. In some embodiments, the patient can be instructed to further make sure the color of the cap screws are different from the color of the pegs, and which are different from the color of the marbles, providing an extra level of cognitive difficulty in the assessment. Moreover, the marbles can be added as the patient masters their skills with the pegs and the cap screws, resulting in a graded activity for the patient.

A scoring sheet can be established to include elements-deficits to both score and include a therapist's skilled observations and comments as to the deficits observed. The scoring sheet can include gross motor skill scoring (such as active range of motion of both a dominant and non-dominant hand), fine motor skill scoring (such as two-point, three point, and lateral pinch, as well as whether the patient pronates their hand while placing the peg into the hole), cognitive skills (such as the ability to follow instructions, attention span, concentration-focus, short term memory and long term memory), and visual skills (such as scanning-tracking, color identification, right-left sided neglect and eye movements).

While the assessment tool of the present invention was originally intended for use by an occupational therapist, the scoring sheet can be used by a school psychologist, neurologist, speech therapist, and pediatrician by only scoring and commenting on the areas of concern with regards to a patient's abilities. Instructions for use of the assessment tool can be updated and/or the scoring sheet as well as the assessment via use and research is standardized. In some embodiments, the scoring sheets can be collected and evaluated (with patent information not present for confidentiality) over a period of time to develop such standardizations. Standards can be established for each aspect of the present invention, depending on the specific need and application.

It should be understood, of course, the foregoing relates to exemplary embodiments of the invention. Modifications may be made without departing from the spirit and scope of the invention as set forth in the following claims.

What is claimed is:

1. An assessment tool comprising:
   at least one peg template consisting of 21 holes arranged thereupon forming five columns and five rows, wherein two of the five columns comprises three holes, three of the five columns comprises five holes, two of the five rows comprises three holes, and three of the five rows comprises five holes ; and
   21 pegs operable to be placed in the holes, wherein
   the 21 pegs consist of six different colors comprising five pegs of a first color, four pegs of a second color, four pegs of a third color, four pegs of a fourth color, two pegs of a fifth color and two pegs of a sixth color; and
   the 21 holes are arranged so the pegs are disposable in the holes so no two pegs of the same color are disposed adjacent to one another.

2. The assessment tool of claim 1, further comprising a threaded insert disposed in an end of each of the pegs.

3. The assessment tool of claim 2, further comprising 21 socket head cap screws operable to be threaded into the threaded insert.

4. The assessment tool of claim 3, wherein the socket head cap screws include five socket head cap screws of the first color, four socket head cap screws of the second color, four socket head cap screws of the third color, four socket head cap screws of the fourth color, two socket head cap screws of the fifth color, and two socket head cap screws of the sixth color.

5. The assessment tool of claim 1, wherein the at least one peg template includes a large peg template, a medium peg template, and a small peg template, wherein the large peg template is operable to receive pegs of a first diameter, the medium peg template is operable to receive pegs of a second diameter smaller than the first diameter, and the small peg template is operable to receive pegs of a third diameter, smaller than the second diameter.

6. The assessment tool of claim 5, further comprising a threaded insert disposed in an end of each of the pegs of the first diameter.

7. The assessment tool of claim 3, further comprising a hex key tool operable to thread the socket head cap screws into the threaded inserts.

8. The assessment tool of claim 3, further comprising 21 marbles operable to be balanced on the socket head cap screws threaded into the threaded insert.

9. The assessment tool of claim 8, wherein the marbles include five marbles of the first color, four marbles of the second color, four marbles of the third color, four marbles of the fourth color, two marbles of the fifth color, and two marbles of the sixth color.

* * * * *